United States Patent
Wei et al.

(10) Patent No.: US 9,202,639 B2
(45) Date of Patent: Dec. 1, 2015

(54) APPARATUS AND ASSOCIATED METHODS

(75) Inventors: Di Wei, Cambridge (GB); Yinglin Liu, Cambridge (GB); Piers Andrew, Cambridge (GB); Markku Rouvala, Helsinki (FI); Chris Bower, Ely (GB); Teuvo Tapani Ryhanen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 166 days.

(21) Appl. No.: 13/588,138

(22) Filed: Aug. 17, 2012

(65) Prior Publication Data

US 2014/0050988 A1    Feb. 20, 2014

(51) Int. Cl.
| | |
|---|---|
| *H01M 4/80* | (2006.01) |
| *H01G 11/70* | (2013.01) |
| *H01M 2/20* | (2006.01) |
| *H01G 11/28* | (2013.01) |
| *H01G 11/84* | (2013.01) |

(52) U.S. Cl.
CPC ............ *H01G 11/70* (2013.01); *H01G 11/28* (2013.01); *H01G 11/84* (2013.01); *H01M 2/20* (2013.01); *H01M 4/80* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 6,036,758 A | 3/2000 | Fairweather | 106/14.44 |
| 6,048,646 A | 4/2000 | Xing et al. | 429/233 |
| 2004/0050816 A1 | 3/2004 | Asakawa et al. | 216/2 |
| 2004/0076795 A1* | 4/2004 | Shimomura et al. | 428/118 |
| 2005/0029105 A1 | 2/2005 | Towsley | 205/57 |
| 2005/0048371 A1 | 3/2005 | Nagayama et al. | 429/245 |
| 2008/0039311 A1* | 2/2008 | Malenfant et al. | 501/87 |
| 2009/0130380 A1* | 5/2009 | Asakawa et al. | 428/116 |
| 2009/0208842 A1 | 8/2009 | Harada et al. | 429/209 |
| 2010/0175354 A1* | 7/2010 | Mizukami et al. | 55/528 |
| 2010/0238607 A1 | 9/2010 | Park et al. | 361/502 |
| 2011/0036493 A1 | 2/2011 | Kawamura et al. | 156/272.8 |
| 2011/0059362 A1* | 3/2011 | West et al. | 429/219 |
| 2011/0070488 A1* | 3/2011 | West et al. | 429/209 |

FOREIGN PATENT DOCUMENTS

| | | |
|---|---|---|
| WO | WO-2012/094006 A1 | 3/2004 |
| WO | WO 2011/055300 A2 | 5/2011 |

OTHER PUBLICATIONS

Nam, D., et al., "Effects of $(NH_4)_2SO_4$ and BTA on the nanostructure of copper foam prepared by electrodeposition", © 2011 Elsevier Ltd., 9 pgs.

(Continued)

*Primary Examiner* — Patrick Ryan
*Assistant Examiner* — Jose Colucci Rios
(74) *Attorney, Agent, or Firm* — Harrington & Smith

(57) ABSTRACT

An apparatus including a layer of electrically conductive material with an open interconnected wall structure of electrically conductive material formed thereon, the open interconnected wall structure having a gyroid structure including one or more open pores into which an active material for use in generating and/or storing electrical charge can be deposited, wherein the layer of electrically conductive material and the open interconnected wall structure together form a charge collector which provides an electrical path from the active material for the generated and/or stored electrical charge.

18 Claims, 12 Drawing Sheets

(56) References Cited

OTHER PUBLICATIONS

Hulteen, J.C., et al., "Nanosphere lithography: A materials general fabrication process for periodic particle array surfaces", © 1995 American Vacuum Society, 6 pgs.

Muroga, T., et al., "Development of Highly Flexible Rolled Copper Foils for FPC Application", Hitachi Cable Review No. 26, Aug. 2007, 4 pgs.

* cited by examiner

Figure 17a  Figure 17b  Figure 17c
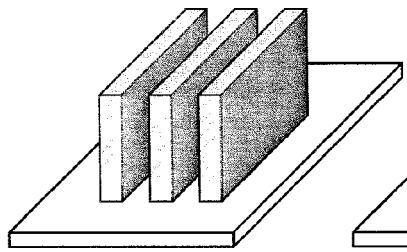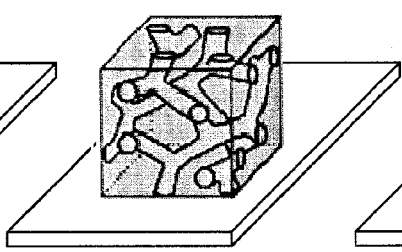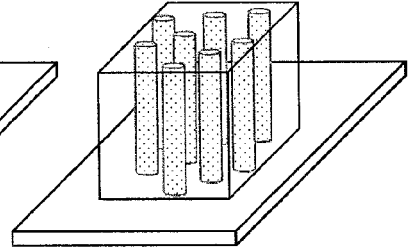
Figure 18a  Figure 18b
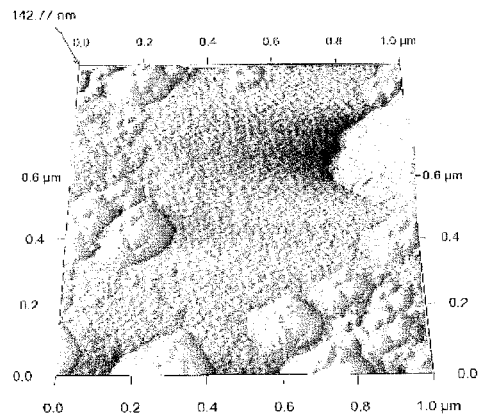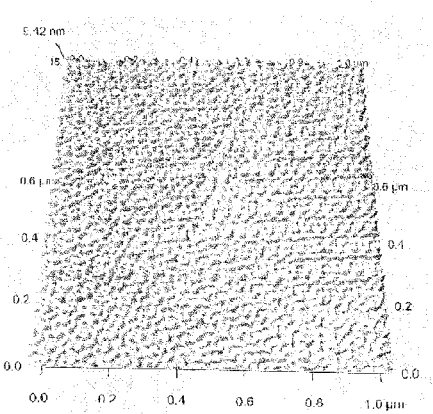
Figure 19
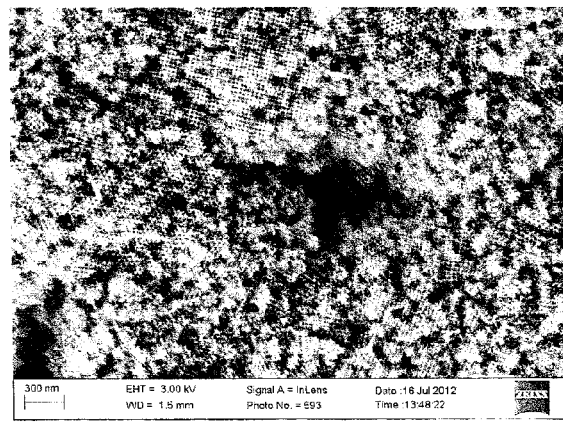

APPARATUS AND ASSOCIATED METHODS

TECHNICAL FIELD

The present disclosure relates to the field of electrical storage cells, associated methods and apparatus, and in particular concerns a high surface area charge collector for an electrode of a storage cell which facilitates greater adhesion to the active electrode material and improves the storage capacity/density and internal resistance of the storage cell. The cell may form part of an electronic device, in particular, so-called hand-portable electronic devices which may be hand-held in use (although they may be placed in a cradle in use). Such hand-portable electronic devices include mobile phones and so-called Personal Digital Assistants (PDAs).

The portable electronic devices may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Energy storage density and capacity are important parameters of any electrical storage apparatus. As portable electronic devices become ever more power hungry, greater demands are being placed on the storage density and capacity of the batteries and capacitors which power these devices. Various high surface area active materials have been considered for the electrodes of next generation storage cells. Examples include activated carbon, carbon nanotubes, metal/semiconductor nanowires and nanoparticle slurries.

High surface area materials increase the electrical storage density/capacity by increasing the area of the electrode which is in contact with the electrolyte, thereby allowing the generation and/or storage of a greater amount of electrical energy. One problem associated with such materials, however, is their particulate form, which reduces the structural integrity of the electrode. This is especially the case with flexible and/or stretchable storage cells, where repeated bending and stretchable of the cell causes the active material to detach from the underlying charge collector resulting in physical degradation of the electrodes and a decrease in device performance. One solution to this problem is to incorporate additional binders into the active material to improve adhesion of the active material to the charge collector. Such binders, however, tend to increase the cost and complexity of the fabrication process, and can also increase the electrical resistance of the electrode.

The apparatus and methods disclosed herein may or may not address this issue.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided an apparatus comprising a layer of electrically conductive material with an open interconnected wall structure of electrically conductive material formed thereon, the open interconnected wall structure having a gyroid structure comprising one or more open pores into which an active material for use in generating and/or storing electrical charge can be deposited, wherein the layer of electrically conductive material and the open interconnected wall structure together form a charge collector which provides an electrical path from the active material for the generated and/or stored electrical charge.

The term "open" in reference to the open interconnected wall structure may be taken to mean that one or more of the pores on the exterior (i.e. open pores) allow access to the internal surface area of the structure. The term "interconnected" in reference to the open interconnected wall structure may be taken to mean that at least some of the walls of the structure are physically connected to one another (i.e. they form a continuous structure).

The term "active material" may be taken to mean an electrode material which takes part in the charging/discharging mechanism of the apparatus. In a battery, for example, the active material may be an electrode material which participates in an electrochemical reaction or intercalation mechanism. In a supercapacitor, on the other hand, the active material may be an electrode material which participates in the formation of an electric double layer.

The expression "generating electrical charge" may be taken to encompass the redox reactions and intercalation mechanisms associated with batteries and battery-capacitor hybrids, whilst the expression "storing electrical charge" may be taken to encompass the charge separation associated with capacitors and battery-capacitor hybrids.

The gyroid structure may be trigonometrically approximated by:

$$\cos x \cdot \sin y + \cos y \cdot \sin z + \cos z \cdot \sin x = 0 \qquad \text{Equation 1}$$

where x, y and z are the three spatial directions.

The layer and open interconnected wall structure may be formed from the same electrically conductive material. The layer and open interconnected wall structure may be formed from different electrically conductive materials.

Some or all of the open pores may be interconnecting. Some or all of the open pores may form through channels within the open interconnected wall structure to the underlying layer of electrically conductive material. Some or all of the open pores may form blind channels within the open interconnected wall structure. Some or all of the open pores may be arranged periodically (i.e. the pores may have a regular repeated spacing). Some or all of the open pores may have a diameter of less than 2 nm (i.e. microporous). Some or all of the open pores may have a diameter of between 2 nm and 50 nm inclusive (i.e. mesoporous). Some or all of the open pores may have a diameter of greater than 50 nm (i.e. macroporous).

The electrically conductive material from which the layer and/or open interconnected wall structure are formed may comprise one or more of copper, aluminium, nickel, platinum, gold and silver. The electrically conductive material from which the open interconnected wall structure is formed may comprise one or more electrically conductive polymers, such as polyaniline, polypyrrole, poly(3,4-ethylenedioxythiophene) and polyazulene.

The open interconnected wall structure may comprise two or more sub-layers of electrically conductive material. For example, the open interconnected wall structure may comprise a sub-layer of carbon on top of a sub-layer of copper, aluminium, nickel, platinum, gold or silver. The sub-layer of carbon may improve the electrical path between the active material and the underlying sub-layer of metal. The sub-layer of carbon may be in the form of activated carbon, carbon nanotubes, carbon nanowires, carbon nanohorns, carbon nano-onions and/or graphene.

The apparatus may comprise an active material within the one or more open pores. The active material may form a coating on the open interconnected wall structure without fully filling the volume of the one or more open pores. The active material may fully fill the volume of the one or more open pores. The active material may be a form of carbon, such as activated carbon, carbon nanotubes, carbon nanowires, carbon nanohorns, carbon nano-onions and/or graphene.

The layer of electrically conductive material may be a constituent layer of a printed wiring board.

The apparatus may comprise a separator. The separator may comprise a deposition or etching template used to form the open interconnected wall structure of electrically conductive material. The separator may comprise a lattice of particles having interconnected spaces between and defined by the plurality of particles. The particles may be polymeric particles, silicon dioxide particles, polystyrene particles or metal particles. The separator may comprise an open porous polymer structure. The separator may have a thickness of up to 10 µm, 20 µm, 30 µm, 40 µm or 50 µm.

The apparatus may be one or more of an electrical storage apparatus, a flexible electrical storage apparatus, a stretchable electrical storage apparatus, an electrode for an electrical storage apparatus, a flexible electrode for an electrical storage apparatus and a stretchable electrode for an electrical storage apparatus. The electrical storage apparatus may be one or more of a battery (primary or secondary battery), a capacitor (electrostatic, electrolytic, or supercapacitor), and a battery-capacitor hybrid.

The apparatus may be a device. The apparatus may be one or more of an electronic device, a portable electronic device, a portable telecommunications device, and a module for any of the aforementioned devices.

According to another aspect, there is provided a method of making an apparatus, the method comprising:
  forming a deposition template on top of a layer of electrically conductive material, the deposition template comprising one or more open pores between the walls of the deposition template, the one or more open pores extending continuously from an outer surface of the deposition template to the underlying layer of electrically conductive material; and
  depositing an electrically conductive material through the one or more open pores and over the walls of the deposition template to form an open interconnected wall structure of electrically conductive material on top of the layer of electrically conductive material, the open interconnected wall structure having one or more open pores into which an active material for use in generating and/or storing electrical charge can be deposited, wherein the layer of electrically conductive material and the open interconnected wall structure together form a charge collector which provides an electrical path from the active material for the generated and/or stored electrical charge.

The method may comprise removing the deposition template following deposition of the electrically conductive material. The deposition template may be removed by wet chemical etching.

The method may comprise depositing an active material within the one or more open pores of the open interconnected wall structure. The active material may be deposited by spin coating, meter-bar coating, rod coating, air-knife coating, slot-die coating, slide-hopper coating, curtain coating, screen printing, electroplating, electroless plating, atomic layer deposition, chemical vapour deposition, electrochemical deposition, sputter coating or evaporation.

The electrically conductive material and/or active material may be deposited over some of the walls of the deposition template to leave part of the deposition template exposed. The exposed part of the deposition template may form a separator.

The method may comprise removing some of the electrically conductive material and/or active material after deposition to expose part of the deposition template. The exposed part of the deposition template may form a separator.

Forming the deposition template may comprise depositing a plurality of particles on top of the layer of electrically conductive material to create a lattice of particles, the lattice of particles constituting the deposition template, the open pores of the deposition template formed from interconnected spaces between and defined by the plurality of particles. The particles of the lattice may or may not be spherical particles.

The particles may be polymeric particles, silicon dioxide particles, polystyrene particles or metal particles. When metal particles are used to form the deposition template, the deposition template may be used as the open interconnected wall structure of electrically conductive material itself without the need to deposit the electrically conductive material through the one or more pores and over the walls of the deposition template. Furthermore, when metal particles are used to form the deposition template, the method may comprise depositing an electrically insulating material over some of the walls of the deposition template to form a separator.

The method may comprise binding the particles of the lattice together after deposition of the particles. The binding may comprise depositing a polymeric binder over the walls of the lattice. The binding may comprise thermal, chemical or electrical sintering of the particles of the lattice.

Forming the deposition template may comprise:
  depositing a block copolymer on top of the layer of electrically conductive material, the block copolymer comprising two or more immiscible polymer blocks; and
  removing one or more of the immiscible polymer blocks to produce an open porous polymer structure, the open porous polymer structure constituting the deposition template.

The one or more immiscible polymer blocks may be removed to produce an open porous polymer structure having a gyroid, double gyroid, vertically-oriented pillar or vertically-oriented lamellar morphology. The one or more immiscible polymer blocks may be removed by wet chemical etching, plasma etching and/or UV exposure.

The electrically conductive material may be deposited by atomic layer deposition, chemical vapour deposition, electrochemical deposition, sputter coating or evaporation.

According to a further aspect, there is provided a method of making an apparatus, the method comprising:
  forming an etching template on top of a layer of electrically conductive material, the etching template comprising one or more open pores extending continuously from an outer surface of the etching template to the underlying layer of electrically conductive material; and
  removing regions of the layer of electrically conductive material by depositing an etchant onto the layer of electrically conductive material via the one or more open pores of the etching template to form an open interconnected wall structure of electrically conductive material from the layer of electrically conductive material, the open interconnected wall structure having one or more open pores into which an active material for use in generating and/or storing electrical charge can be deposited, wherein the open interconnected wall structure serves as a charge collector which provides an electrical path from the active material for the generated and/or stored electrical charge.

The method may comprise removing the etching template following removal of the regions of the layer of electrically conductive material. The etching template and/or the regions of the layer of electrically conductive material may be removed by wet chemical etching, plasma etching and/or UV exposure.

The method may comprise depositing an active material within the one or more open pores of the open interconnected wall structure. The active material may be deposited by spin coating, meter-bar coating, rod coating, air-knife coating, slot-die coating, slide-hopper coating, curtain coating, screen printing, electroplating, electroless plating, atomic layer deposition, chemical vapour deposition, electrochemical deposition, sputter coating or evaporation.

Forming the etching template may comprise depositing a plurality of particles on top of the layer of electrically conductive material to create a lattice of particles, the lattice of particles constituting the etching template, the open pores of the etching template formed from interconnected spaces between and defined by the plurality of particles. The particles of the lattice may or may not be spherical particles.

The particles may be polymeric particles, silicon dioxide particles, polystyrene particles or metal particles. When metal particles are used to form the etching template, the method may comprise depositing an electrically insulating material over some of the walls of the etching template to form a separator.

The method may comprise binding the particles of the lattice together after deposition of the particles. The binding may comprise depositing a polymeric binder over the walls of the lattice. The binding may comprise thermal, chemical or electrical sintering of the particles of the lattice.

Forming the etching template may comprise:
depositing a block copolymer on top of the layer of electrically conductive material, the block copolymer comprising two or more immiscible polymer blocks; and
removing one or more of the immiscible polymer blocks to produce an open porous polymer structure, the open porous polymer structure constituting the etching template.

Forming the deposition/etching template may comprise aligning the two or more immiscible polymer blocks relative to the layer of electrically conductive material before removal of the one or more immiscible polymer blocks. This may be required if the block copolymer has a pillar or lamellar morphology to ensure that the pillars or layers of the block copolymer are oriented perpendicular to the underlying layer of electrically conductive material, otherwise removal of the one or more immiscible polymer blocks may not produce pores which extend continuously from an outer surface of the deposition/etching template to the underlying layer of electrically conductive material. Alignment of the two or more immiscible polymer blocks may be performed using surface energy modification of the layer of electrically conductive material followed by thermal annealing and/or an applied electric field.

The one or more immiscible polymer blocks may be removed to produce an open porous polymer structure having a gyroid, double gyroid, vertically-oriented pillar or vertically-oriented lamellar morphology. The one or more immiscible polymer blocks may be removed by wet chemical etching, plasma etching and/or UV exposure.

The steps of any method disclosed herein do not have to be performed in the exact order disclosed, unless explicitly stated or understood by the skilled person.

According to a further aspect, there is provided a computer program (which may or may not be recorded on a carrier), the computer program comprising computer code configured to perform any method described herein.

According to a further aspect, there is provided an apparatus comprising a processor, the processor configured to process the code of the aforementioned computer program. The processor may be a microprocessor, including an Application Specific Integrated Circuit (ASIC).

The present disclosure includes one or more corresponding aspects, example embodiments or features in isolation or in various combinations whether or not specifically stated (including claimed) in that combination or in isolation. Corresponding means and corresponding functional units (e.g. supporter) for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

FIG. 17a illustrates schematically the vertically-oriented lamellar morphology of a block copolymer;

FIG. 17b illustrates schematically the gyroid morphology of a block copolymer;

FIG. 17c illustrates schematically the vertically-oriented pillar morphology of a block copolymer;

FIG. 18a is an atomic force microscope image showing the surface topology of an untreated copper foil;

FIG. 18b is an atomic force microscope image showing the surface topology of a gyroid polymer template formed on top of a copper foil; and FIG. 19 is a scanning electron microscope image showing the structural details of a copper gyroid formed on top of a copper foil.

DESCRIPTION OF SPECIFIC ASPECTS/EMBODIMENTS

In electrical circuits, batteries and capacitors are used to provide other components with electrical power. These power supplies operate in different ways, however.

Figure 1A:
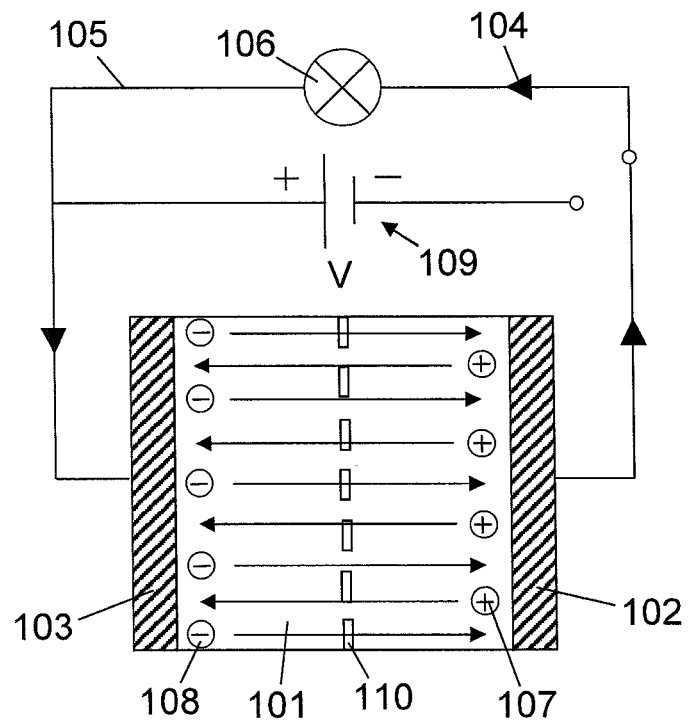
FIG. 1a illustrates schematically the discharge process of a conventional battery.

Batteries use electrochemical reactions to generate electricity. The discharge process of a conventional battery is shown in FIG. 1a. Batteries comprise two electrical terminals (electrodes 102, 103) separated by an electrolyte 101. A battery may also contain a separator 110 to prevent direct physical contact between the electrodes, which is particularly important when liquid electrolytes are used. At the negative electrode (the anode 102), an oxidation reaction takes place which produces electrons. These electrons flow round an external circuit 105 (indicated by the arrows 104) from the anode 102 to the positive electrode (the cathode 103) causing a reduction reaction to take place at the cathode 103. The flow of electrons can be used to power one or more electrical components 106 in the external circuit 105. The oxidation and reduction reactions may continue until the reactants are completely converted. Importantly though, unless electrons are able to flow from the anode 102 to the cathode 103 via the external circuit 105, the electrochemical reactions cannot take place. This allows batteries to store electricity for long periods of time. As the electrons flow round the external circuit from the anode 102 to the cathode 103, a negative charge cloud develops in the electrolyte 101 around the cathode 103, and a positive charge cloud develops in the electrolyte 101 around the anode 102. Positive 107 and negative 108 ions in the electrolyte 101 move to neutralise these charge clouds, allowing the reactions, and the flow of electrons, to continue. Without the ions 107, 108 from the electrolyte 101, the charge clouds around each electrode 102, 103 would inhibit the generation of electricity.

Figure 1B:
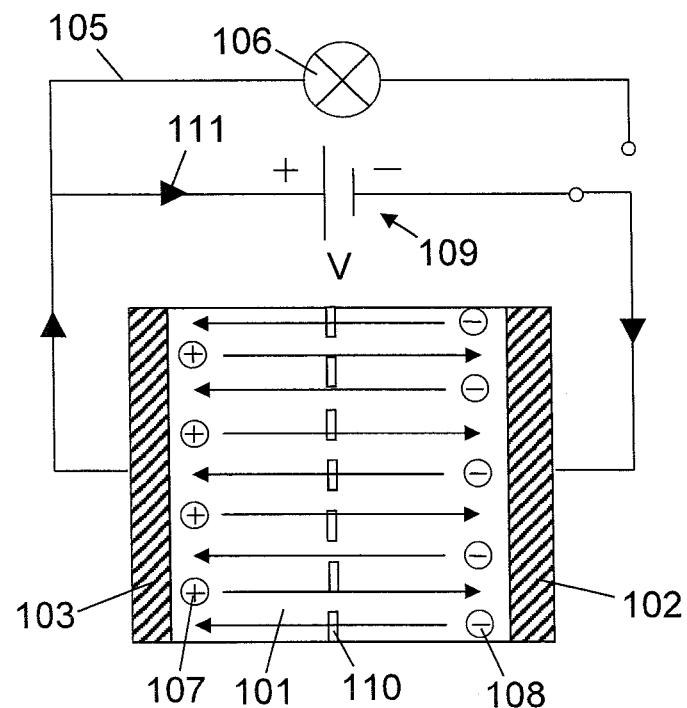
FIG. 1b illustrates schematically the charging process of a conventional battery.

A primary cell is any kind of battery in which the electrochemical reaction is irreversible. These are used as disposable batteries. With secondary batteries, on the other hand, the electrochemical reaction is reversible, meaning that the chemical reactants can be restored to their original states. These are used as rechargeable batteries. The charging process of a conventional rechargeable battery is shown in FIG. 1b. To charge the battery, a potential difference is applied between the anode 102 and cathode 103. The positive terminal of the charger 109 strips electrons from the cathode 103 and returns them to the anode 102 (indicated by the arrows 111), inducing chemical reactions at the electrode-electrolyte interface. Again, to compensate for the transfer of charge, positive 107 and negative 108 ions in the electrolyte 101 move between the electrodes 102, 103 in opposite directions to before.

The current and voltage generated by a battery is directly related to the materials used for the electrodes and electrolyte. The ability of a material to lose or gain electrons with respect to another material is known as its electrode potential. The strengths of oxidising and reducing agents are indicated by their standard electrode potentials. Materials with a positive electrode potential are used to form the anode, whilst those with a negative electrode potential are used to form the cathode. The greater the difference between the anode and cathode potentials, the greater the amount of electrical energy that can be produced by the cell.

Lithium appears at the top of the electrochemical series (large negative electrode potential), indicating that it is the strongest reducing agent. Likewise, fluorine appears at the bottom of the electrochemical series (large positive electrode potential), indicating that it is the strongest oxidising agent. As a result of lithium's high electrode potential, lithium batteries are capable of producing voltages of nearly 4V, over twice the voltage of a zinc-carbon or alkaline battery. Depending on the choice of materials for the anode, cathode and electrolyte, the current, voltage, capacity, life and safety of a lithium battery can change dramatically.

A lithium-ion battery is a different type of rechargeable battery which uses a lithium ion "intercalation" mechanism rather than traditional redox reactions. This involves the insertion of lithium ions into and out of the crystal structure of the electrodes as the ions pass back and forth between the electrodes during charging and discharging. To achieve this, the electrodes require open crystal structures which allow the insertion and extraction of lithium ions, and the ability to accept compensating electrons at the same time. Such electrodes are called "intercalation hosts". Lithium-ion batteries are currently one of the most popular types of battery for portable electronics because they exhibit one of the best energy-to-weight ratios, no memory effect, and a slow loss of charge when not in use.

In a typical lithium-ion battery, the anode is made from carbon, the cathode is a metal oxide, and the electrolyte is a lithium salt in an organic solvent. Commercially, the most popular anode material is graphite, and the cathode is generally one of three materials: a layered oxide (such as lithium cobalt oxide), one based on a polyanion (such as lithium iron phosphate), or a spinel (such as lithium manganese oxide). The electrolyte is typically a mixture of organic carbonates such as ethylene carbonate or diethyl carbonate containing complexes of lithium ions. These non-aqueous electrolytes often comprise non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$).

Figure 2A:
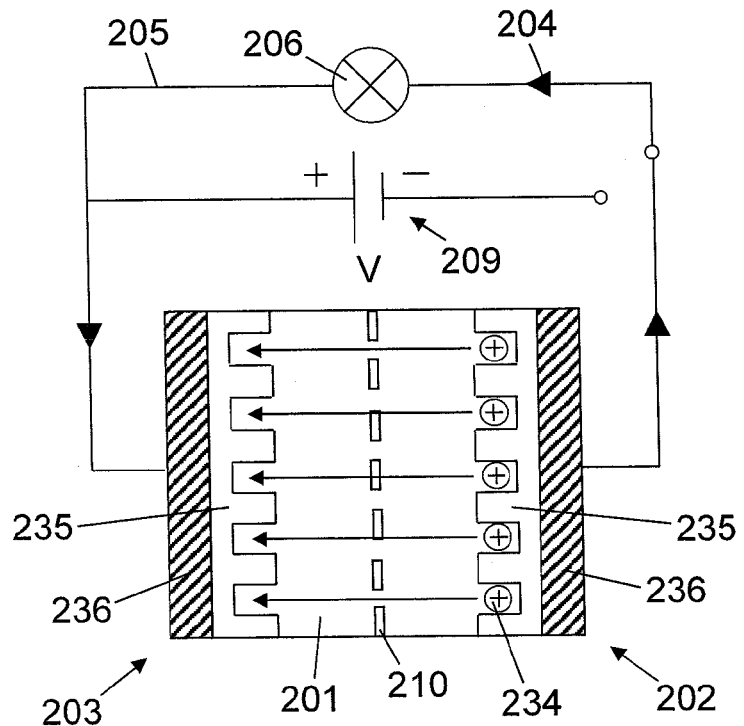
FIG. 2a illustrates schematically the discharge process of a lithium-ion battery.
Figure 2B:
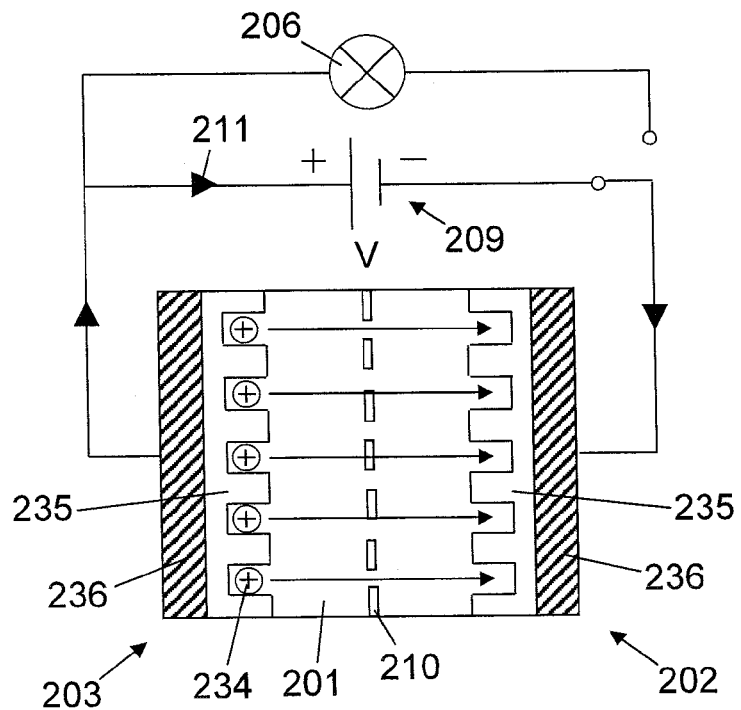
FIG. 2b illustrates schematically the charging process of a lithium-ion battery.

FIGS. 2a and 2b illustrate schematically the discharge and charging processes of a lithium-ion battery, respectively. As shown in the figures, the anode 202 and cathode 203 each comprise an open-crystal intercalation material 235 deposited on top of a charge-collecting substrate 236. During discharge, lithium ions 234 are extracted from the anode 202, migrate across the electrolyte 201, and are inserted into the crystal structure of the cathode 203. At the same time, compensating electrons travel in the external circuit (in a direction indicated by the arrows 204) and are accepted by the cathode 203 to balance the reaction. This process is reversible. During charging, an external electrical power source (the charger 209) applies a potential difference between the electrodes 202, 203 forcing the electrons to travel in the opposite direction (indicated by the arrows 211). The lithium ions 234 are then extracted from the cathode 203, migrate across the electrolyte 201, and are inserted back into the crystal structure of the anode 202.

In a lithium-ion battery, the lithium ions are transported to and from the cathode and anode, with the transition metal, cobalt (Co), in $Li_xCoO_2$ being oxidised from $Co^{3+}$ to $Co^{4+}$ during charging, and reduced from $Co^{4+}$ to $Co^{3+}$ during discharge. The anode and cathode half-reactions for a lithium-ion battery comprising a graphite anode and a lithium cobalt oxide cathode are as follows:

$$\text{Anode } xLi^+ + xe^- + 6C \rightleftarrows Li_xC_6 \qquad \text{Equation 2}$$

$$\text{Cathode } LiCoO_2 \rightleftarrows Li_{1-x}CoO_2 + xLi^+ + xe^- \qquad \text{Equation 3}$$

The overall reaction has its limits, however. Overdischarging the lithium-ion battery can supersaturate the lithium cobalt oxide, leading to the production of lithium oxide, by the following irreversible reaction:

$$Li^+ + LiCoO_2 \rightarrow Li_2O + CoO \qquad \text{Equation 4}$$

whilst overcharging the lithium-ion battery can lead to the synthesis of $Co^{4+}$ by the following irreversible reaction:

$$LiCoO_2 \rightarrow Li^+ + CoO_2 \qquad \text{Equation 5}$$

In contrast to batteries, capacitors store charge electrostatically, and are not capable of generating electricity. A relatively new type of capacitor known as a "supercapacitor" (also known as an electric double layer capacitor, an ultracapacitor, a pseudocapacitor, and an electrochemical double layer capacitor) offers greater energy storage than a conventional or electrolytic capacitor, and is becoming increasingly popular for portable electronic applications.

Figure 3A:
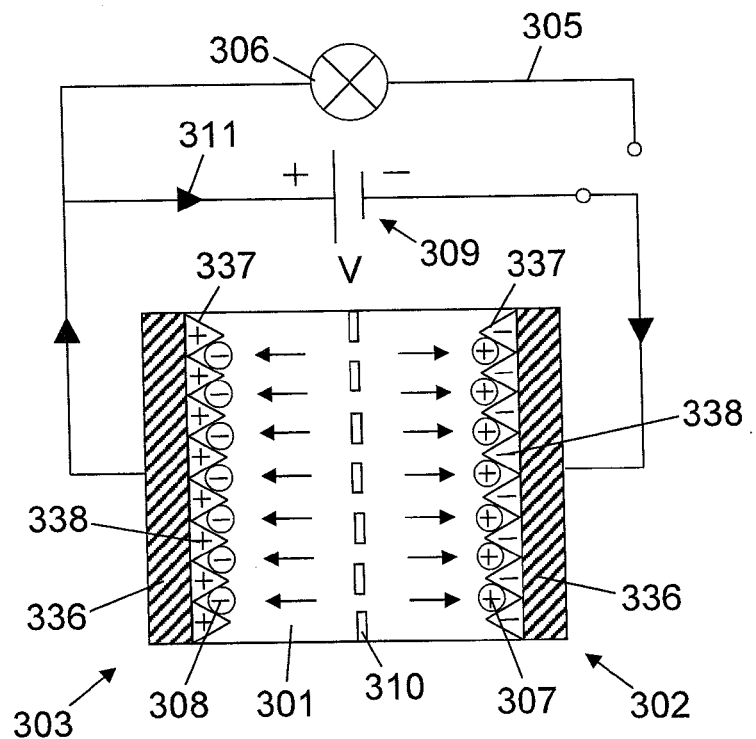
FIG. 3a illustrates schematically the charging process of a supercapacitor.
Figure 3B:
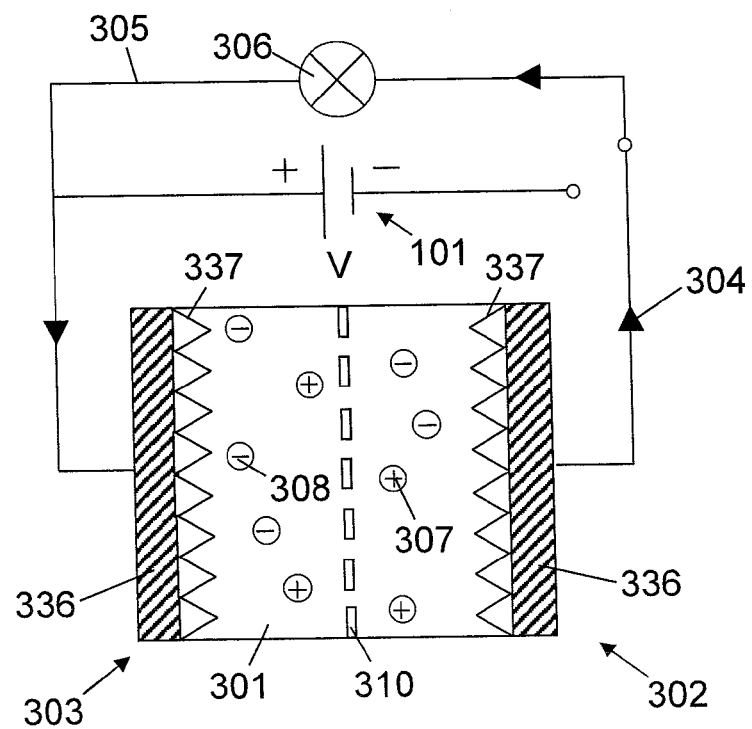
FIG. 3b illustrates schematically the discharge process of a supercapacitor.

FIGS. 3a and 3b illustrate schematically the charging and discharge processes of a supercapacitor, respectively. Supercapacitors have a cathode 303 and an anode 302, each comprising an electrically conducting plate 336 (charge collector), which are separated by an electrolyte 301. When a liquid electrolyte is used, the supercapacitor may also comprise a separator 310 to prevent direct physical contact between the cathode and anode. The plates 336 are coated in a porous material 337 (such as powdered carbon) to increase their surface area for greater charge storage. When a power supply (charger) applies a potential difference between the electrodes 302, 303, the electrolyte 301 becomes polarised. The potential on the cathode 303 attracts negative ions 308 in the electrolye 301, and the potential on the anode 302 attracts positive ions 307.

Unlike batteries, the applied potential is kept below the breakdown voltage of the electrolyte 301 to prevent electrochemical reactions from taking place at the surface of the electrodes 302, 303. For this reason, supercapacitors cannot generate electricity like electrochemical cells. Also, without electrochemical reactions taking place, no electrons are generated. As a result, no significant current can flow between the electrolyte 301 and the electrodes 302, 303. Instead, the ions 307, 308 in solution arrange themselves at the surfaces of the electrodes 302, 303 to mirror the surface charge 338 and form an insulating "electric double layer". In an electric double layer (i.e. a layer of surface charge 338 and a layer of ions 307, 308), the separation of the surface charge 338 and ions 307, 308 is on the order of nanometers. The combination of the electric double layer and the use of a high surface area material 337 on the surface of the plates 336 allow a huge number of charge carriers to be stored at the electrode-electrolyte interface.

To discharge the supercapacitor, an electrical connection 305 is made between the charged electrodes 302, 303, causing electrons to flow from the anode to the cathode via the external circuit (as indicated by the arrows 304). This flow of charge can be used to power one or more electrical components 306 in the external circuit 305.

Supercapacitors have several advantages over batteries, and as a result, have been tipped to replace batteries in many applications. They function by supplying large bursts of current to power a device and then quickly recharging themselves. Their low internal resistance, or equivalent series resistance (ESR), permits them to deliver and absorb these large currents, whereas the higher internal resistance of a traditional chemical battery may cause the battery voltage to collapse. Also, whilst a battery generally demands a long recharging period, supercapacitors can recharge very quickly, usually within a matter of minutes. They also retain their ability to hold a charge much longer than batteries, even after multiple chargings. When combined with a battery, a supercapacitor can remove the instantaneous energy demands that would normally be placed on the battery, thereby lengthening the battery lifetime.

Whereas batteries often require maintenance and can only function well within a small temperature range, supercapacitors are maintenance-free and perform well over a broad temperature range. Supercapacitors also have longer lives than batteries, and are built to last until at least the lifetime of the electronic devices they are used to power. Batteries, on the other hand, typically need to be replaced several times during the lifetime of a device.

Supercapacitors are not without their drawbacks, however. Despite being able to store a greater amount of energy than conventional and electrolytic capacitors, the energy stored by a supercapacitor per unit weight is considerably lower than that of an electrochemical battery. In addition, the working voltage of a supercapacitor is limited by the electrolyte breakdown voltage, which is not as issue with batteries.

Lithium-ion batteries have the highest energy density of all systems, whilst supercapacitors have the highest power density and lifetime. Recently, a new hybrid storage device called a lithium-ion capacitor has been developed which aims to integrate the advantages of lithium-ion batteries and supercapacitors. The cathode of a lithium-ion capacitor employs activated carbon at which charges are stored as an electric double layer at the interface between the carbon and the electrolyte, similar to a supercapacitor. The anode, on the other hand, is made of a nanostructured intercalation material pre-doped with lithium ions, similar to a lithium-ion battery. This pre-doping process lowers the anode potential and results in a high cell output voltage. Typically, output voltages for lithium-ion capacitors are in the range of 3.8V to 4V. As a consequence, lithium-ion capacitors have a high energy density.

Furthermore, the capacity of the anode is several orders of magnitude greater than the capacity of the cathode. As a result, the change in anode potential during charging and discharging is far smaller than the change in cathode potential. The intercalation anode can also be coupled with an intercalation cathode, such as $LiCoO_2$ or $LiMn_2O_4$, to increase the power of the lithium-ion capacitor. The electrolyte used in a lithium-ion capacitor is typically a lithium-ion salt solution, and a separator may be used to prevent direct physical contact between the anode and cathode.

Figure 4A:
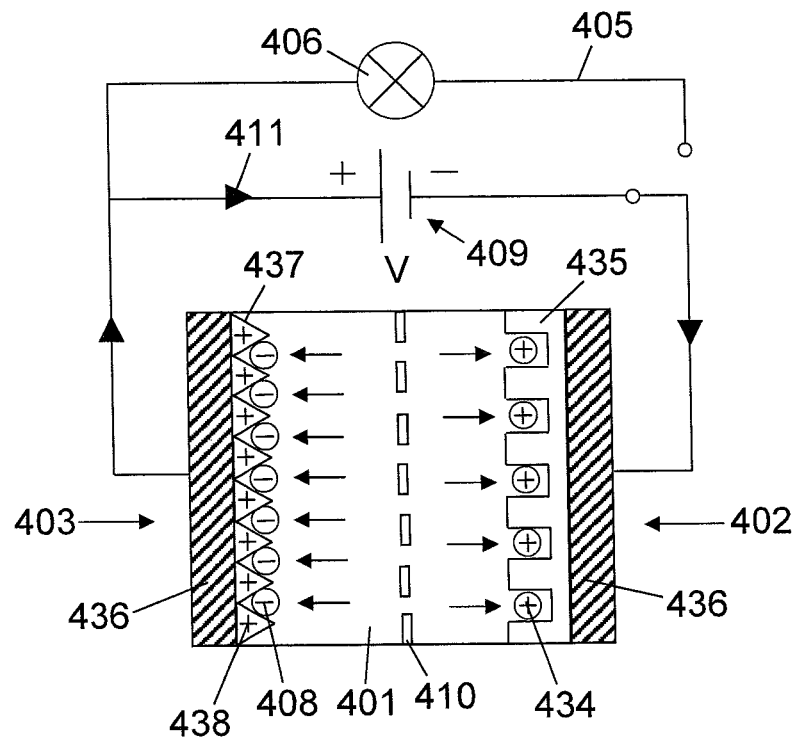
FIG. 4a illustrates schematically the charging process of a lithium-ion capacitor.
Figure 4B:
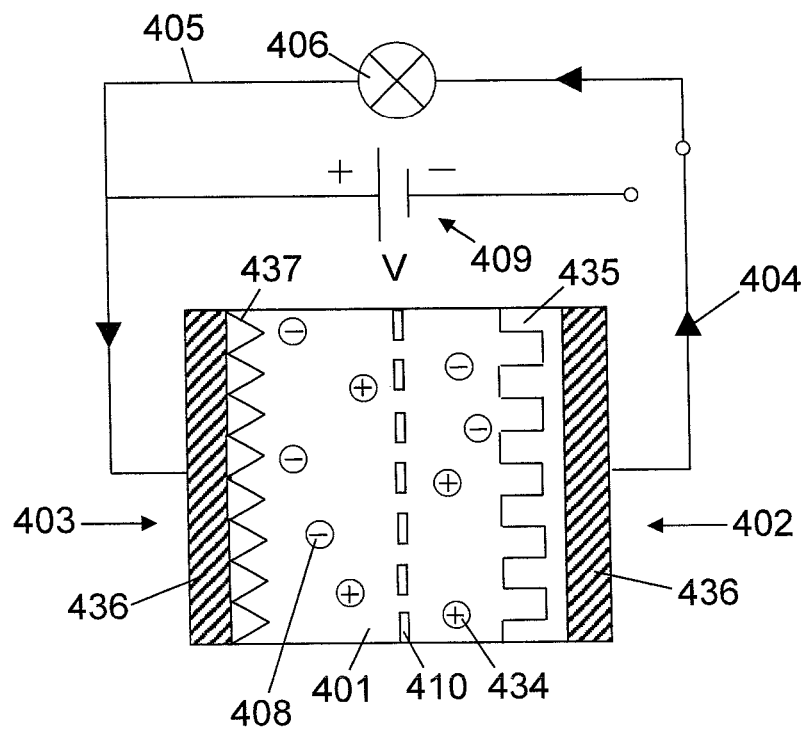
FIG. 4b illustrates schematically the discharge process of a lithium-ion capacitor.

FIGS. 4a and 4b illustrate schematically the charging and discharge processes of a lithium-ion capacitor, respectively. The behaviour of a lithium-ion capacitor is much the same as that of a supercapacitor, and therefore the reference numerals of FIGS. 4a and 4b correspond to similar features in FIGS. 3a and 3b. The main difference between the two systems, however, is that instead of positive ions in the electrolyte 401 arranging themselves at the electrode-electrolyte interface to form an electric double layer when the device charges, lithium ions 434 insert themselves (intercalation) into the crystal structure 435 of the anode 402. Like a lithium-ion battery, therefore, lithium-ion capacitors undergo fast electrochemical reactions and do not simply rely on the formation of an electric double layer to store electrical charge.

Figure 5:
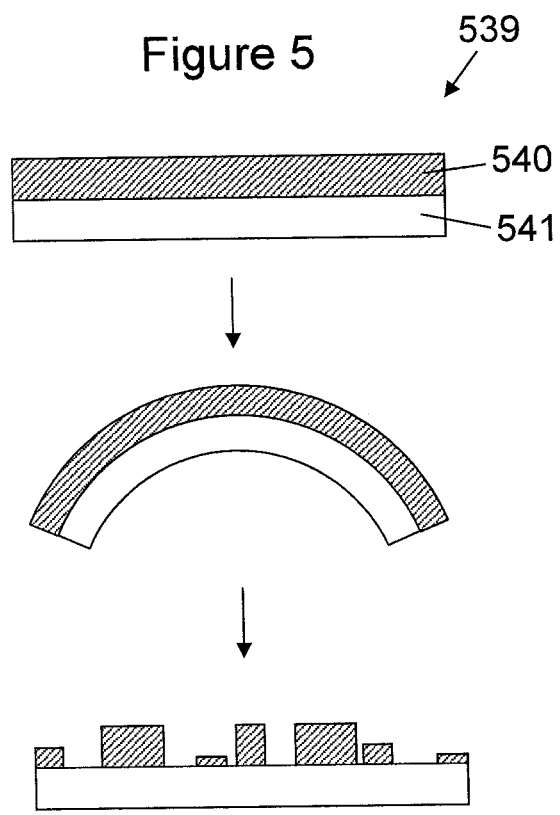
FIG. 5 illustrates schematically the physical degradation of the active material of flexible and/or stretchable storage cells.

As stated in the background section, the electrodes of current flexible and/or stretchable storage cells often suffer from low structural integrity as a result of their particulate form. This is illustrated in FIG. 5, where the electrode 539 comprises an active material 540 on top of a layer of electrically conductive material 541 (the charge collector). As a result of poor adhesion to the underlying charge collector 541, the active material 540 becomes at least partly detached from the electrically conductive material 541 during repeated bending and/or stretching of the storage cell. Whilst additional binders can be added to the active material 540 to improve adhesion, this can increase the internal resistance of the electrode 539 and may also reduce the energy-to-weight ratio of the storage cell. There will now be described an apparatus and associated methods that may provide an alternative solution to this problem.

Figure 6:
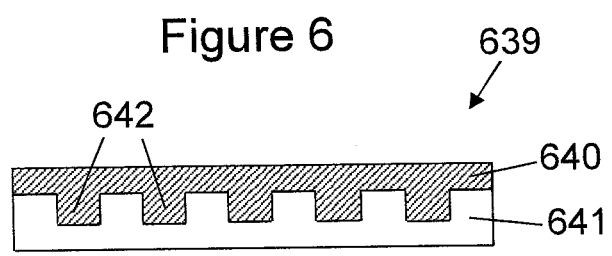
FIG. 6 illustrates schematically an electrode comprising a charge collector with an open interconnected wall structure.

The present apparatus (as shown in FIG. 6) comprises a layer of electrically conductive material 641 having an open interconnected wall structure. The open interconnected wall structure comprises one or more open pores 642 into which an active material 640 for use in generating and/or storing electrical charge can be deposited. The layer of electrically conductive material 641 with the open interconnected wall structure serves as a charge collector which provides an electrical path from the active material 640 for the generated and/or stored electrical charge.

The open interconnected wall structure increases the surface roughness and surface area of the charge collector 641. Since the active material 640 is deposited on top of the charge collector 641, the increased roughness improves adhesion of the active material 640 thereby reducing degradation of the electrode 639. In addition, the additional surface area increases the amount of active material 640 in direct contact with the charge collector 641, which improves the storage density and capacity of the cell 639 and reduces the overall impact on device performance if some of the active material 640 does become detached.

The open interconnected wall structure can be distinguished from the general roughness of a layer of electrically conductive material based on a number of features. First of all, the regularity of the structure; and the size, shape, number, spacing and configuration of the pores are representative of the deposition or etching template used to form the structure (described in detail later). This is evident from the atomic force microscope (AFM) images shown in FIGS. 18a and 18b and the scanning electron microscope (SEM) image shown in FIG. 19. FIG. 18a shows the surface topology of an untreated copper foil; FIG. 18b shows the surface topology of a gyroid polymer template formed on top of a copper foil; and FIG. 19 shows the structural details of a copper gyroid (i.e. an open interconnected wall structure) formed on top of a copper foil. As can be seen, the surface roughness of the polymer and copper gyroids is on a finer scale (nm vs μm) than the roughness of the copper foil and has a more regular configuration.

Another distinguishing feature is the colour of the open interconnected wall structure. When the open interconnected wall structure is formed by depositing or etching through the templates described herein, the pores in the resulting structure hinder the reflection of light. As a result, the structure appears darker than a piece of the same bulk material (e.g. the copper gyroid of FIG. 19 appears black rather than the usual reddish brown colour associated with bulk copper).

Figure 7:
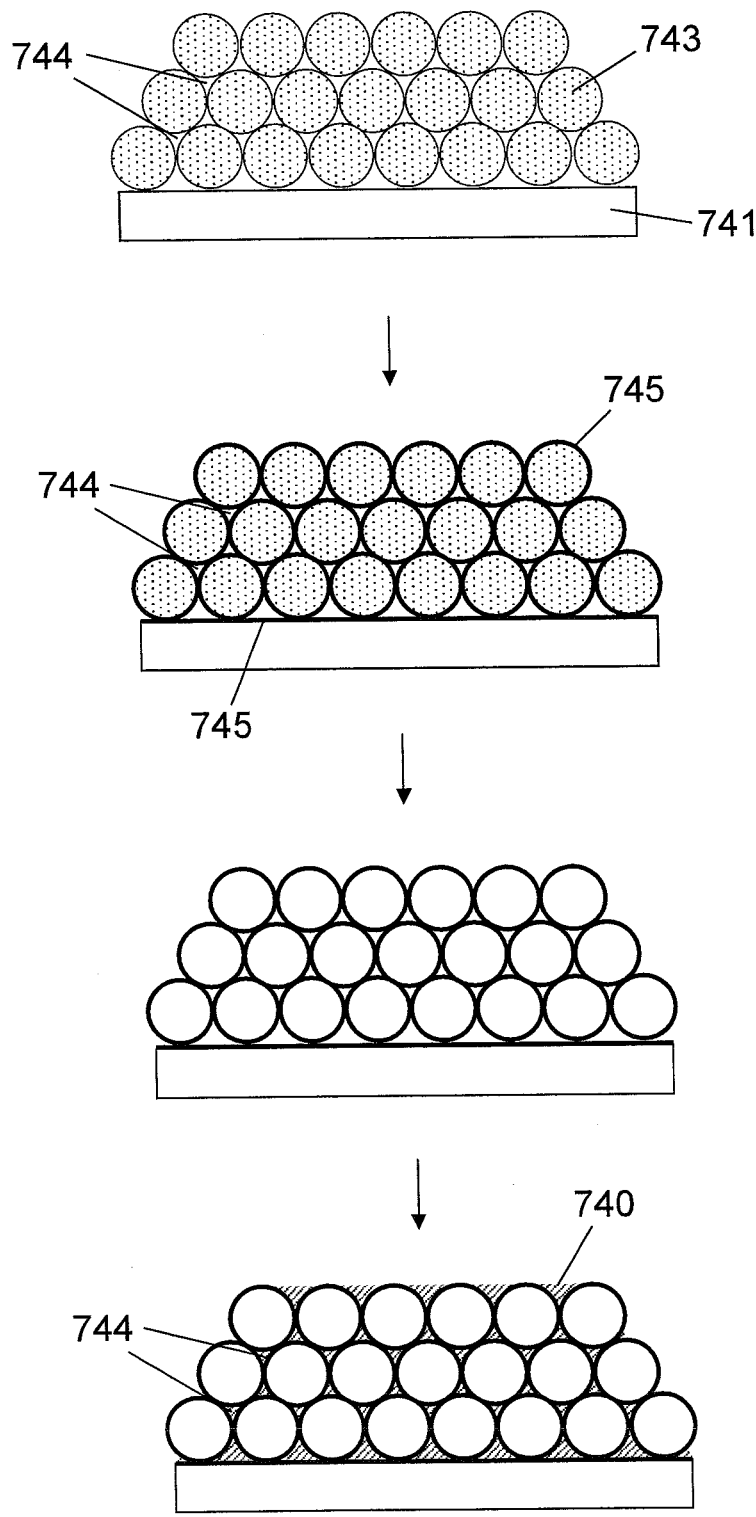
FIG. 7 illustrates one method of forming the electrode of FIG. 6 comprising depositing an electrically conductive material onto a layer of electrically conductive material through the spaces between the particles of a lattice.

There are a number of ways in which the present apparatus may be formed. One method is illustrated in FIG. 7 (in cross-section), in which a lattice of particles 743 (e.g. spherical polystyrene particles) is formed on top of a layer of electrically conductive material 741. The lattice of particles 743 comprises one or more open pores 744 extending continuously from an outer surface of the lattice 743 to the underlying layer of electrically conductive material 741, the pores 744 formed from interconnected spaces (not shown, but would be apparent when viewed from above) between and defined by the particles. To hold the particles together in the form of a lattice, a polymer binder may be deposited onto the walls of the lattice. Alternatively, the particles may be bound together by thermal, chemical or electrical sintering.

An electrically conductive material 745 is then deposited (e.g. using atomic layer deposition (ALD), chemical vapour deposition (CVD), electrochemical deposition (ECD), sputter coating or evaporation) through the one or more open pores 744 and over the walls of the lattice 743 such that the deposited material 745 is in contact with both the layer of electrically conductive material 741 and the lattice 743. The lattice of particles 743 therefore serves as a deposition template for the electrically conductive material 745, and the open interconnected wall structure is formed from the deposited electrically conductive material 745. In this case, the open interconnected wall structure takes on the face centred cubic "opal" shape of the lattice 743.

CVD, ALD and ECD are particularly useful here because the deposition is independent of the orientation of the specimen surface. With evaporation and sputtering techniques, on the other hand, the specimen surface needs to be in the line-of-sight of the material source. Nevertheless, this issue can be addressed by using multiple material sources arranged to face different surfaces of the specimen, or by using a single material source and multiple deposition steps (and rotating the specimen or material source between each deposition). Even if evaporation or sputtering techniques are used to provide a complete coating, however, the coating is unlikely to have a uniform thickness due to the overlap from each deposition step. In this sense, conformal deposition techniques such as CVD (including plasma-enhanced CVD), ALD and ECD are preferable. ALD also has the advantage that it can produce pinhole-free films. This factor is useful for forming an electrode of an electrical storage cell because pinholes in the electrically conductive material can increase the electrical resistance of the cell. ECD is also useful in the sense that, if the layer of electrically conductive material 741 is used as one of the deposition electrodes, it can be assured that the deposited material 745 is electrically continuous with the underlying layer 741. A possible disadvantage of ECD, however, is that it may completely fill some of the pores 744 of the lattice 743 with the electrically conductive material 745, thereby reducing the surface area of the charge collector which is in physical contact with the later-deposited active material 746.

Since the particles are packed together in the form of a lattice 743, the electrically conductive material 745 on the surface of one particle is in physical and electrical contact with the electrically conductive material 745 on the surface of an adjacent particle. In this way, the resulting structure comprises a continuous layer of electrically conductive material 745 and a plurality of pores 744. The electrically conductive material 745 also serves to bind the particles of the lattice 743 together, thereby improving the rigidity of the structure.

Whilst FIG. 7 shows spherical particles, this method could be performed using any appropriately shaped/sized particles (not necessarily all the same shape/size) provided that they are able to form a lattice 743 comprising one or more pores 744 extending continuously from an outer surface of the lattice 743 to the underlying layer of electrically conductive material 741.

There is no need to remove the particles of the lattice 743 upon which the electrically conductive material 745 is deposited. However, removal of the particles can reduce the overall weight of the electrical storage device, which is an important factor given that storage cells are often characterised by their energy-to-weight ratio. Nevertheless, the particles can provide mechanical support for the electrically conductive 745 and active 740 materials. The decision on whether or not to remove the particles after deposition of the electrically conductive material 745 will therefore depend partly on the mechanical strength of the electrically conductive material 745. If the electrically conductive material 745 is unable to support the active material 740 on its own without mechanical deformation, the underlying particles may also be required.

If the particles were to be removed, some of the electrically conductive material 745 may need to be removed first to provide access to the particles. This step could be performed using a wet or dry chemical etch such as a galvanostatic or poteniostat etch. Once the particles are exposed, they can then be etched, melted or dissolved. It is important, however, that the electrically conductive material 745 is more resistant to the etchant than the particles, otherwise this step could partially or completely remove (or damage) the electrically conductive material 745. Removal of the particles results in an interconnected wall structure of electrically conductive material 745 which is lightweight, open and porous, with a high surface area.

Once the open interconnected wall structure has been formed, the active material 740 can then be deposited onto the electrically conductive material 741, 745 to form the electrode. As with deposition of the electrically conductive material 745 onto the lattice of particles 743, CVD, ALD and ECD are particularly useful because they can be used to coat surfaces which are not in the line-of-sight of the material source. Other techniques which may be used to deposit the active material 740 include spin coating, meter-bar coating, rod coating, air-knife coating, slot-die coating, slide-hopper coating, curtain coating or screen printing (which can be performed in a roll-to-roll manner), as well as electroplating or electroless plating.

The active material 740 may be deposited such that it forms a coating on the open interconnected wall structure without fully filling the volume of the one or more open pores 744, or it may be deposited such that it fully fills the volume of the one or more pores 744. The former configuration is more desirable, however, because it enables an electrolyte to enter the one or more pores 744 of the open interconnected wall structure and interact with a greater amount of the active material 740 during use of the electrode (which increases the electrical storage density and capacity of the cell).

Figure 8:
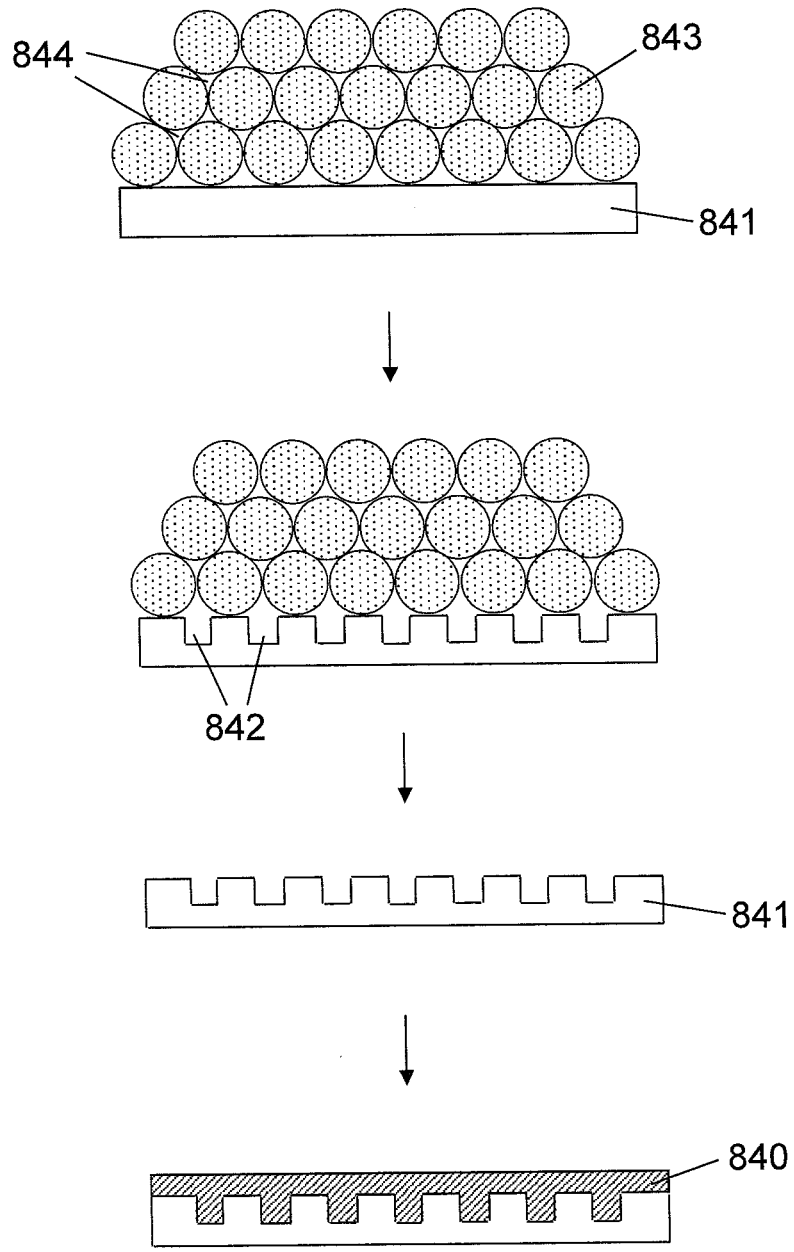
FIG. 8 illustrates another method of forming the electrode of FIG. 6 comprising etching a layer of electrically conductive material through the spaces between the particles of a lattice.

FIG. 8 illustrates another method which can be used to form the present apparatus. As with the previous method, a lattice of particles 843 is formed on top of a layer of electrically conductive material 841. This time, however, an etchant (e.g. a wet chemical etchant) is deposited onto the layer of electrically conductive material 841 via the one or more open pores 844 of the lattice 843 to remove regions 842 of the underlying layer 841. The lattice of particles 843 therefore serves as an etching template, and the open interconnected wall structure is formed from the layer of electrically conductive material 841. With this configuration, the arrangement of pores 842 created in the open interconnected wall structure by the etching process coincides with the arrangement of pores 844 in the lattice 843.

After etching the layer of electrically conductive material 841, the lattice of particles 843 can be removed (e.g. by wet or dry chemical etching, washing the surface with a suitable solvent, and/or using mechanical force) to expose the open interconnected wall structure. The active material 840 may then be deposited on top of the layer of electrically conductive material 841 using one or more of the techniques mentioned previously.

It is not absolutely necessary to remove the particles before deposition of the active material 840. If the particles are maintained, the active material 840 could be deposited in the open pores 844 of the lattice as well as the open pores 842 of the layer of electrically conductive material 841. In this way, the active material 840 holds the particles together and binds the lattice 843 to the layer of electrically conductive material 841. However, the active material 840 in the pores 844 of the lattice 843 would need to be in physical and electrical contact with the active material 840 in the pores 842 of the underlying layer 841 otherwise charge generated/stored using the active material 840 in the pores 844 of the lattice 843 could not be collected. This embodiment would also require the active material 840 to be electrically conductive.

Figure 9:
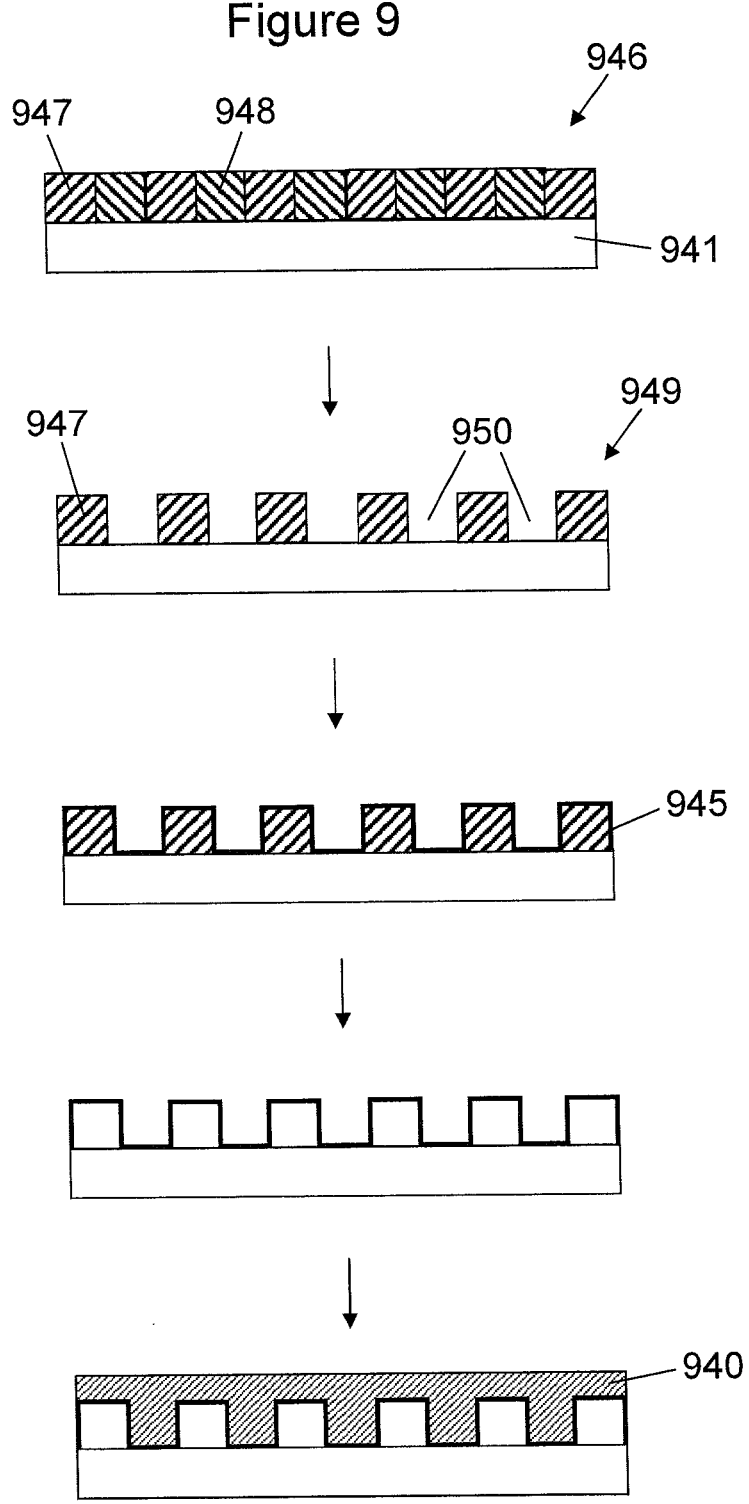
FIG. 9 illustrates another method of forming the electrode of FIG. 6 comprising depositing an electrically conductive material onto a layer of electrically conductive material through the pores of a block copolymer.

FIG. 9 illustrates another method of making the present apparatus which is similar to the method illustrated in FIG. 7. This time, instead of forming a lattice of spherical particles, however, the electrically conductive material 945 is deposited onto a block co-polymer 946. Block co-polymers 946 comprise two or more chemically distinct polymers (e.g. polystyrene and PMMA; polystyrene and polyimide; or polyfluorostyrene and polylactic) linked together by a covalent bond at one end, and have the ability to self-assemble into a variety of different phase morphologies (e.g. spherical, vertically-oriented pillar, horizontally-oriented pillar, gyroid, double gyroid, vertically-oriented lamellar, and horizontally-oriented lamellar morphologies). The specific morphology formed depends upon the volume fraction and molecular weight of the component polymers. FIGS. 17a-17c illustrate the vertically-oriented lamellar, gyroid and vertically-oriented pillar morphologies, respectively.

First, a block copolymer 946 formed from two or more immiscible polymer blocks 947, 948 is dissolved in a solvent and deposited (e.g. by spin casting or any of the coating/printing techniques used to deposit the active material) on top of a layer of electrically conductive material 941 as a thin film (typically with a thickness of between 100 nm and 10 µm). The thin film is then annealed at a prescribed temperature for 1-100 mins in an inert atmosphere (e.g. nitrogen). The annealing process may be performed using a controlled temperature ramp of 1-10° C./min. As the solvent evaporates, the block copolymer self-organises and phase-separates so that the polymer blocks 947, 948 form a phase-separated film 946 on the underlying layer 941. Phase morphologies which can be used to create continuous pathways to the layer of electrically conductive material 941 are suitable for use in the present application. These include the gyroid, double gyroid, vertically-oriented pillar and vertically-oriented lamellar morphologies.

One of the immiscible polymer blocks 947, 948 (or perhaps two if the block copolymer is a triblock copolymer rather than a diblock copolymer) is then removed from the phase-separated film 946 (block copolymer) to produce an open porous polymer structure 949 with one or more open pores 950 extending continuously from an outer surface of the polymer structure 949 to the underlying layer of electrically conductive material 941. This step may be performed using a wet chemical etch (e.g. for 1-180 mins), UV exposure, or a combination of the two depending on the specific polymers to be removed.

Once the porous polymer structure 949 has been formed, an electrically conductive material 945 can be deposited through the one or more open pores 950 and over the walls of the polymer structure 949 such that the deposited material 945 is in contact with both the layer of electrically conductive material 941 and the polymer structure 949. The porous polymer structure 949 therefore serves as a deposition template for the electrically conductive material 945, and the open interconnected wall structure is formed from the deposited electrically conductive material 945. In this case, the open interconnected wall structure takes on the three-dimensional shape of the polymer structure 949 (i.e. the gyroid, double gyroid, vertically-oriented pillar or vertically-oriented lamellar structure). This particular method may therefore be used to produce an open interconnected wall structure having a gyroid structure.

The polymer structure 949 shown in FIG. 9 comprises a plurality of ordered pores 950. The arrangement of the pores 950 within the structure 949 depends, however, on the specific polymers and the fabrication conditions. In some cases the pores 950 may be interconnected, but in other cases they may not be. Interconnection of the pores 950 is not absolutely necessary, but it increases the surface area of the charge collector, and may therefore improve the storage density and capacity of the cell. Furthermore, although some of the pores 950 must form through channels from an outer surface of the polymer structure 949 to the underlying layer of electrically conductive material 941, other pores 950 may form blind channels (i.e. open at the surface but terminating inside the structure) or internal channels (i.e. contained within the structure) in the polymer structure 949.

As per the method shown in FIG. 7, the deposition template (polymer structure 949 in this case) may be removed following deposition of the electrically conductive material 945 to increase the energy-to-weight ratio of the storage cell. Whether or not this should be done, however, depends on the structural integrity of the electrically conductive material 945. The active material 940 can then be deposited onto the open interconnected wall structure using one or more of the deposition techniques described previously.

Figure 10:
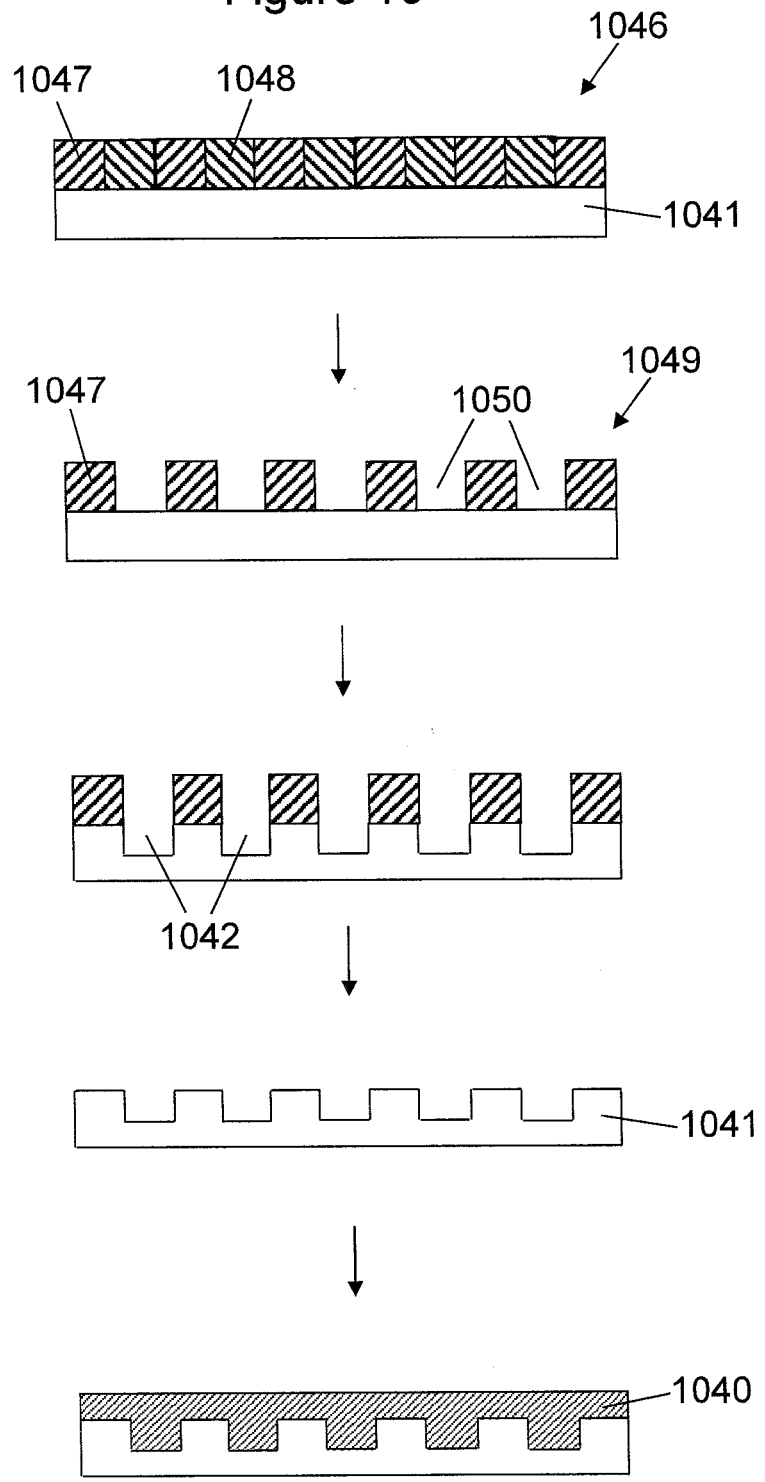
FIG. 10 illustrates another method of forming the electrode of FIG. 6 comprising etching a layer of electrically conductive material through the pores of a block copolymer.

Rather than using the open porous polymer structure as a deposition template, it may be used as an etching template in a similar way to the lattice of particles 843 in FIG. 8. This method is shown in FIG. 10. As before, an etchant (e.g. a wet chemical etchant) is deposited onto the layer of electrically conductive material 1041 via the one or more open pores 1050 of the etching template (polymer structure 1049 in this case) to remove regions 1042 of the underlying layer 1041. The open interconnected wall structure is therefore formed from the layer of electrically conductive material 1041 with an arrangement of pores 1042 which coincides with those of the polymer structure 1049.

After etching the layer of electrically conductive material 1041, the porous polymer structure 1049 may or may not be removed (e.g. by wet or dry chemical etching, washing the surface with a suitable solvent, and/or using mechanical force) before the active material 1040 is deposited on top of the layer of electrically conductive material 1041. In this case, removal of the polymer structure 1049 before deposition of the active material 1040 may be advantageous if the polymer 1049 completely covers the uppermost surface of the layer of electrically conductive material 1041 (as shown). This is because less of the active material 1040 would be in contact with the layer of electrically conductive material 1041 which could increase the internal resistance of the cell. That said, the total depth of the pores 1042 is greater when the polymer 1049 is maintained, which enables a greater amount of active material 1040 to be contained within the pores 1042 and may increase the storage density and capacity of the cell.

Whilst the deposition or etching template (i.e. the particle lattice or porous polymer structure) may be removed after deposition/etching of the electrically conductive material, it could be retained to form a separator for the electrical storage cell. Separators are used to prevent physical (and therefore electrical) contact between the anode and cathode of the cell which would otherwise short the cell and prevent the generation and/or storage of electrical energy.

To provide this functionality, the separator should itself be electrically insulating. In relation to FIGS. 7 and 9, therefore, the electrically conductive material and/or active material may be deposited (e.g. using electroplating for the electrically conductive material or a liquid deposition technique for the active material) to leave the upper part of the deposition template (i.e. the part furthest from the layer of electrically conductive material) exposed. The exposed part of the deposition template may then be used as a separator provided that the particle lattice or porous polymer structure is made from an electrically insulating material. Alternatively, if the electrically conductive material and/or active material is deposited onto the upper part of the deposition template, this material could be removed by etching. Furthermore, if the particle lattice is formed from a plurality of metallic particles, an electrically insulating material may need to be deposited onto the upper part of the lattice to make the exposed part of the template electrically insulating.

Using the deposition or etching template as an integral separator is advantageous in the sense that it prevents the need to deposit a separator after formation of the electrode and therefore simplifies manufacture of the cell.

The specific fabrication process that was used to form the copper gyroid shown in FIG. 19 will now be described. This process corresponds with the method shown in FIG. 9.

First, a poly(4-fluorostyrene-r-styrene)-b-poly(d,l-lactide) block copolymer with a molecular weight ratio of 23:8 kg/mol and a polydispersity index of 1.10 was deposited onto a copper foil by spin coating from a 11% weight-by-weight in toluene. After spin coating, the specimen was placed in a vacuum oven at 90° C., and the temperature was ramped up at 3° C./min until it reached 150° C. During the temperature increase, the oven was filled with nitrogen and pumped to vacuum four times to ensure that all moisture was removed. The temperature was then ramped up to 173° C. at a rate of 2.5° C./min. Once the temperature had reached 173° C., the over was filled with nitrogen once again and the specimen was left for 20 mins.

After thermal processing, the specimen was etched for 2 hours in 0.1M NaOH within a 50:50 volume solution of methanol:water to remove the poly(d,l-lactide) phase. FIG. 18b shows the resulting polymer template.

Copper metal was then deposited through the polymer template by electroplating. This was performed using an "Amperometry" Autolab™ setup (>0.1 s at −1.5V followed by up to 1800 s at 0.3V) with a platinum counter electrode and a silver/silver chloride wire reference in a 0.1M copper sulphate:0.1M boric acid plating solution.

As is clear from the above description, the open interconnected wall structure described herein can have a number of different forms depending on the specific fabrication process that was used to make it. In particular, the size, shape, number, spacing and configuration of the pores may vary (e.g. by adjusting the molecular weight of the component polymers of a block copolymer template). Some or all of the pores may be interconnecting; some or all of the pores may form through channels within the open interconnected wall structure (i.e. from one side of the structure to the other); and some or all of the pores may form blind channels within the open interconnected wall structure (i.e. open at one side of the structure but terminating inside the structure). In addition, the pores may or may not be arranged periodically (i.e. having a regular repeated spacing); and may have a diameter of less than 2 nm (microporous), between 2 nm and 50 nm inclusive (mesoporous), or greater than 50 nm (macroporous).

Furthermore, the charge collector which is formed using the above-mentioned deposition or etching techniques could have a range of different thicknesses (e.g. 100 nm to 10 μm). When the deposition techniques are used to form the charge collector, the overall thickness will be dependent upon the thickness of the layer of electrically conductive material as well as the thickness of the open interconnected wall structure (which itself is dependent upon the thickness of the deposition template). On the other hand, when the etching techniques are used to form the charge collector, the overall thickness will be dependent solely upon the thickness of the layer of electrically conductive material if the etching template is removed after etching, or by the thickness of the electrically conductive material and the thickness of the etching template if the etching template is maintained after etching.

A whole range of electrically conductive and active materials could be used to make the electrode. For example, the electrically conductive material from which the layer and/or open interconnected wall structure are formed may comprise one or more of copper, aluminium, nickel, platinum, gold and silver. In some embodiments the layer and open interconnected wall structure may be formed from the same electrically conductive material, whilst in other embodiments, the layer and open interconnected wall structure may be formed from different electrically conductive materials. The active material could be any of the anode or cathode materials used in existing storage cells, such as those described with reference to FIGS. 1-4.

According to one specific example, an anode for a lithium-ion battery may be made by mixing graphite particles, carbon black and a binder together in the weight ratio 85%:10%:5%, respectively, and adding water or an organic solution to obtain a printable slurry. The viscosity of the printable slurry may need to be tailored to ensure that it is able to wet the surfaces of the open interconnected wall structure. The printable slurry is then be deposited (e.g. using a known printing technique) onto a charge collector comprising the open interconnected wall structure, and dried at 80° C. for 1 hour.

Likewise, a cathode for a lithium-ion battery may be made by mixing a lithium-metal-oxide (e.g. $LiCoO_2$, $LiMnO_4$ or $LiFeO_4$) together with a binder in the weight ratio 95%:5%, respectively, and adding water or an organic solution to obtain a printable slurry. Again, the viscosity of the slurry may need to be tailored. The printable slurry is then deposited onto a separate charge collector and dried at 80° C. for 1 hour.

Figure 11:
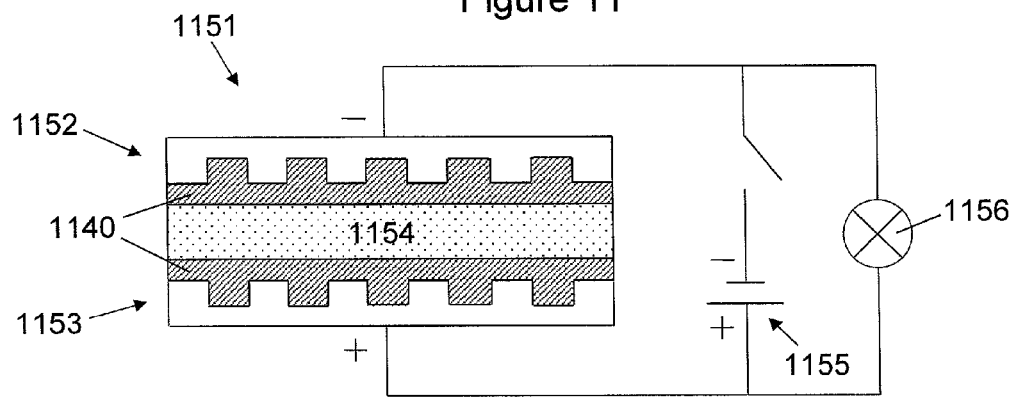
FIG. 11 illustrates schematically an electrical storage cell comprising electrodes as shown in FIG. 6.

A complete storage cell 1151 (in this case a lithium-ion battery) can then be made by sandwiching an electrolyte 1154 between the anode 1152 and cathode 1153, as illustrated in FIG. 11. The electrolyte 1154 may be a liquid electrolyte contained within a separator, or it may be a gel electrolyte. Suitable examples of electrolytes include poly(ethylene oxide), and 1M $LiPF_6$ in propylcarbonate. Depending on whether or not the active material 1140 completely fills the pores of the open interconnected wall structure, the electrolyte 1154 may be deposited within the pores of the electrodes 1152, 1153 as well as on the outer surface. In general, the greater the amount of active material 1140 in contact with the electrolyte 1154, the greater the amount of charge that can be generated and/or stored by the cell. A lithium-ion battery as described above may have an open circuit voltage of ~3.3V.

The electrically conductive and active materials of the anode 1152 and cathode 1153 are not limited to any specific materials, and may comprise a variety of different elements and compounds. The same is true of the electrolyte 1154, although the material used to form the electrolyte 1154 will depend largely on the chemistry of the active electrode materials 1140. The electrical storage cell 1151 is therefore not limited to a lithium-ion battery, but could be any type of battery, capacitor or battery-capacitor hybrid.

Electrochemical experiments were performed on "treated" and "untreated" electrodes to test the effectiveness of the open interconnected wall structure described herein at retaining the active material (in this case activated carbon), and electrical measurements were performed on supercapacitors comprising these "treated" and "untreated" electrodes to determine the impact of the open interconnected wall structure on the electrical properties of the storage cell. In these experiments, copper foils comprising the open interconnected wall structure and activated carbon (the "treated" electrodes) were compared with copper foils comprising activated carbon but without the open interconnected wall structure (the "untreated" electrodes). The results showed a marked improvement in adhesion after treatment of the electrodes. In addition, the capacitance of the treated and untreated supercapacitors was measured to be 234 $mF/cm^2$ and 71 $mF/cm^2$, respectively, whilst the equivalent series resistance (ESR) of the treated and untreated supercapacitors was measured to be 5.81 $\Omega cm^2$ and 7.630 $\Omega cm^2$, respectively. These measurements show that good adhesion between the active material and the charge collector can enhance the performance of storage cells in terms of electrical storage density/capacity and internal resistance.

The storage cell 1151 may be connected to a power supply 1155 and one or more electronic components 1156. The power supply 1155 can be used to charge the storage cell 1151, and the storage cell 1151 can be used to power the one or more electronic components 1156. In one example, the power supply 1155 may be a battery and the storage cell 1151 may be a supercapacitor. In this scenario, the supercapacitor 1151 may be used to provide short bursts of power to the electronic components 1156 (i.e. by discharging), and the battery 1155 can be used to recharge the supercapacitor 1151 after it has been discharged. This setup may be required, for example, if one of the electronic components 1156 was a camera flash.

Figure 12:
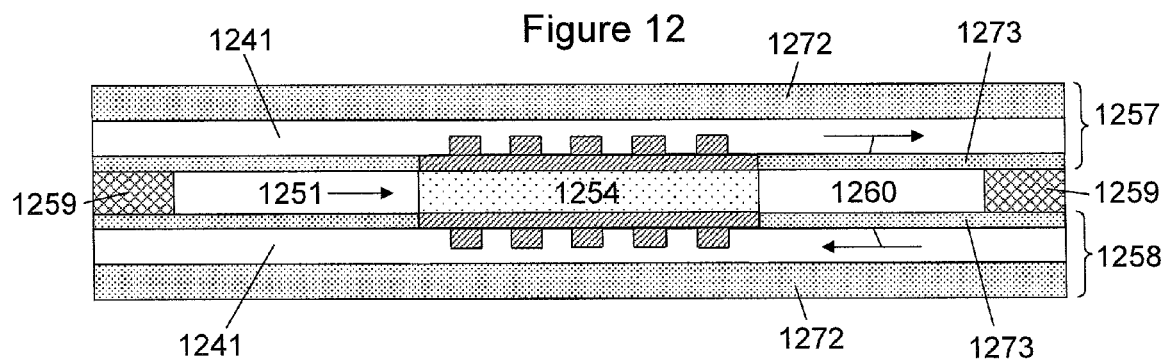
FIG. 12 illustrates schematically an electrical storage cell as shown in FIG. 11 integrated within a circuit board structure.

As shown in FIG. 12, the layer of electrically conductive material 1241 which is used to form part of the cathode and/or anode may be a constituent layer of a printed wiring board (e.g. a flexible printed circuit (FPC) board). This feature allows the electrical storage cell 1251 to be integrated within the printed wiring board structure. In the illustrated example, the anode is integrated within a first printed wiring board 1257 and the cathode is integrated within a second printed wiring board 1258. The first 1257 and second 1258 printed wiring boards are then joined together (e.g. using an adhesive 1259) to form a single structure. Conductive traces would typically be formed in the layers of electrically conductive material 1241 to enable charging and discharging of the electrical storage cell 1251, as indicated by the arrows 1260. In order to prevent the electrolyte 1254 from evaporating, escaping and/or drying out, the first 1257 and second 1258 printed wiring boards should be joined together in such a way that a fluid-tight seal is formed around the storage cell 1251. Furthermore, each of the first 1257 and second 1258 printed wiring boards shown here comprise a layer of electrically insulating material 1272, 1273 (e.g. polyimide) on either side of the layer of electrically conductive material 1241. The inner layers of electrically insulating material 1273 help to prevent direct physical contact (and therefore electrical contact) between the layers of electrically conductive material 1241.

Figure 13:
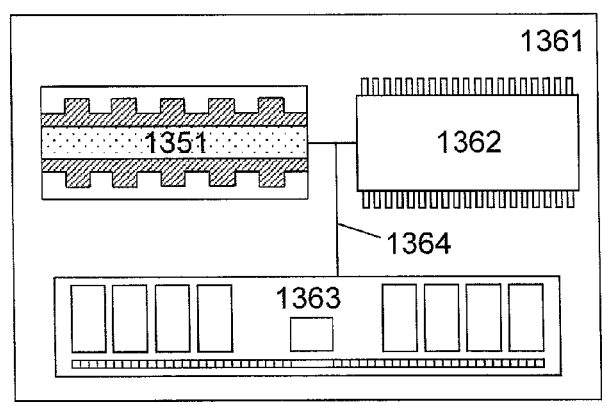
FIG. 13 illustrates schematically a device comprising the electrical storage cell of FIG. 11.

FIG. 13 illustrates schematically an apparatus/device 1361 comprising the electrical storage apparatus 1351 described herein. The apparatus/device 1361 also comprises a processor 1362 and a storage medium 1363, which are electrically connected to one another by a data bus 1364. The apparatus/device 1361 may be an electronic device, a portable electronic device, a portable telecommunications device, or a module for any of the aforementioned devices.

The electrical storage apparatus 1351 is configured to generate and/or store electrical charge, which may be used to power one or more components of the apparatus/device 1361. The processor 1362 is configured for general operation of the apparatus/device 1361 by providing signalling to, and receiving signalling from, the other device components to manage their operation. The storage medium 1363 is configured to store computer program code configured to perform, control or enable operation of the electrical storage apparatus 1351. The storage medium 1363 may also be configured to store settings for the other device components. The processor 1362 may access the storage medium 1363 to retrieve the component settings in order to manage operation of the device components. In particular, the storage medium 1363 may comprise voltage settings for charging the electrical storage apparatus 1351. The internal connections 1364 between the processor 1362 and storage medium 1363 can be understood to provide active coupling between the processor 1362 and storage medium 1363 to allow the processor 1362 to access the computer program code stored on the storage medium 1363. The storage medium 1363 may be a temporary storage medium such as a volatile random access memory. On the other hand, the storage medium 1363 may be a permanent storage medium such as a hard disk drive, a flash memory, or a non-volatile random access memory.

Figure 14:
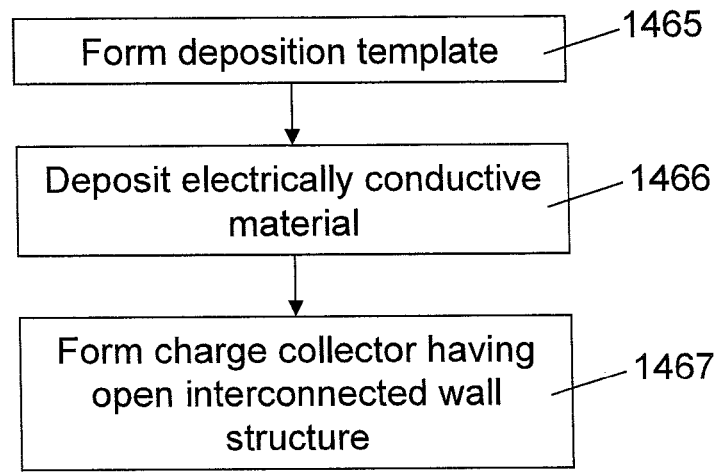
FIG. 14 illustrates schematically the key steps of the methods of FIGS. 7 and 9.
Figure 15:
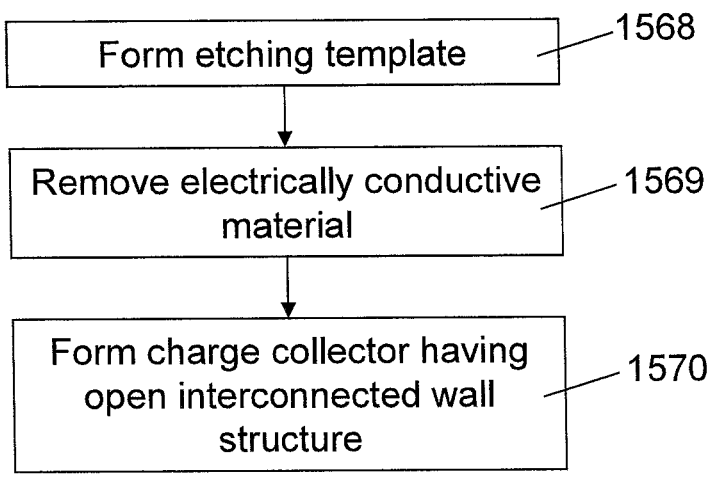
FIG. 15 illustrates schematically the key steps of the methods of FIGS. 8 and 10.

The main steps 1465-1467 of the fabrication methods shown in FIGS. 7 and 9 are illustrated schematically in FIG. 14, whilst the main steps 1568-1570 of the fabrication methods shown in FIGS. 8 and 10 are illustrated schematically in FIG. 15.

Figure 16:
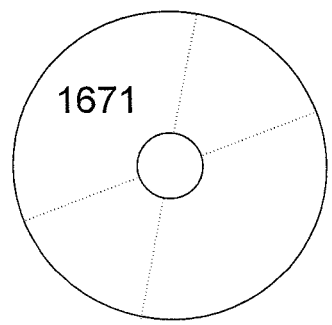
FIG. 16 illustrates schematically a computer readable medium providing a program for controlling the methods of FIGS. 7-10.

FIG. 16 illustrates schematically a computer/processor readable medium 1671 providing a computer program according to one embodiment. In this example, the computer/processor readable medium 1671 is a disc such as a digital versatile disc (DVD) or a compact disc (CD). In other embodiments, the computer/processor readable medium 1671 may be any medium that has been programmed in such a way as to carry out an inventive function. The computer/processor readable medium 1671 may be a removable memory device such as a memory stick or memory card (SD, mini SD or micro SD).

The computer program may comprise computer code configured to perform, control or enable one or more of the following method steps:

forming a deposition template on top of a layer of electrically conductive material, the deposition template comprising one or more open pores between the walls of the deposition template, the one or more open pores extending continuously from an outer surface of the deposition template to the underlying layer of electrically conductive material; and depositing an electrically conductive material through the one or more open pores and over the walls of the deposition template to form an open interconnected wall structure of electrically conductive material on top of the layer of electrically conductive material, the open interconnected wall structure having one or more open pores into which an active material for use in generating and/or storing electrical charge can be deposited, wherein the layer of electrically conductive material and the open interconnected wall structure together form a charge collector which provides an electrical path from the active material for the generated and/or stored electrical charge.

Additionally or alternatively, the computer program may comprise computer code configured to perform, control or enable one or more of the following method steps:

forming an etching template on top of a layer of electrically conductive material, the etching template comprising one or more open pores extending continuously from an outer surface of the etching template to the underlying layer of electrically conductive material; and removing regions of the layer of electrically conductive material by depositing an etchant onto the layer of electrically conductive material via the one or more open pores of the etching template to form an open interconnected wall structure of electrically conductive material from the layer of electrically conductive material, the open interconnected wall structure having one or more open pores into which an active material for use in generating and/or storing electrical charge can be deposited, wherein the open interconnected wall structure serves as a charge collector which provides an electrical path from the active material for the generated and/or stored electrical charge.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising a layer of electrically conductive material with an open interconnected wall structure of electrically conductive material formed thereon, the open interconnected wall structure having a gyroid structure defined by a lattice of substantially spherical particles defining one or more open pores, some or all of the open pores being arranged periodically, the one or more open pores being located in the wall structure, and an active material deposited within the one or more open pores, the active material for use in generating and/or storing electrical charge, wherein the layer of electrically conductive material and the open interconnected wall structure together form a charge collector which provides an electrical path from the active material for the generated and/or stored electrical charge, wherein only some of the open pores are interconnecting, and wherein at least some of the open pores have a diameter of between 2 nm and 50 nm inclusive.

2. The apparatus of claim 1, wherein the layer and open interconnected wall structure are formed from the same electrically conductive material, or are formed from different electrically conductive materials.

3. The apparatus of claim 1, wherein some or all of the open pores form through channels within the open interconnected wall structure to the underlying layer of electrically conductive material, and wherein some or all of the open pores form blind channels within the open interconnected wall structure.

4. The apparatus of claim 1, wherein the active material forms a coating on the open interconnected wall structure without fully filling the volume of the one or more open pores.

5. The apparatus of claim 1, wherein the active material fully fills the volume of the one or more open pores.

6. The apparatus of claim 1, wherein the layer of electrically conductive material is a constituent layer of a printed wiring board.

7. The apparatus of claim 1, wherein the apparatus is one or more of an electrical storage apparatus, a flexible electrical storage apparatus, a stretchable electrical storage apparatus, an electrode for an electrical storage apparatus, a flexible electrode for an electrical storage apparatus and a stretchable electrode for an electrical storage apparatus.

8. A method of making an apparatus, the method comprising:
   forming a deposition template on top of a layer of electrically conductive material, the deposition template comprising one or more open pores between the walls of the deposition template, the one or more open pores extending continuously from an outer surface of the deposition template to the underlying layer of electrically conductive material; and depositing an electrically conductive material through the one or more open pores and over the walls of the deposition template to form an open interconnected wall structure of electrically conductive material on top of the layer of electrically conductive material, the open interconnected wall structure defined by a lattice of substantially spherical particles defining one or more open pores, some or all of the open pores being arranged periodically, the one or more open pores being located in the wall structure, and depositing an active material within the one or more open pores, the active material for use in generating and/or storing electrical charge, wherein the layer of electrically conductive material and the open interconnected wall structure together form a charge collector which provides an electrical path from the active material for the generated and/or stored electrical charge, wherein only some of the open pores are interconnecting, and wherein at least some of the open pores have a diameter of between 2 nm and 50 nm inclusive.

9. The method of claim 8, wherein the method comprises removing the deposition template following deposition of the electrically conductive material.

10. The method of claim 8, wherein forming the deposition template comprises depositing a plurality of particles on top of the layer of electrically conductive material to create the lattice of particles, the lattice of particles constituting the deposition template, the open pores of the deposition template formed from interconnected spaces between and defined by the plurality of particles.

11. The method of claim 8, wherein forming the deposition template comprises:
depositing a block copolymer on top of the layer of electrically conductive material, the block copolymer comprising two or more immiscible polymer blocks; and
removing one or more of the immiscible polymer blocks to produce an open porous polymer structure, the open porous polymer structure constituting the deposition template.

12. The method of claim 11, wherein the one or more immiscible polymer blocks are removed to produce an open porous polymer structure having a gyroid, double gyroid, vertically-oriented pillar or vertically-oriented lamellar morphology.

13. A method of making an apparatus, the method comprising:
forming an etching template on top of a layer of electrically conductive material, the etching template comprising one or more open pores extending continuously from an outer surface of the etching template to the underlying layer of electrically conductive material; and
removing regions of the layer of electrically conductive material by depositing an etchant onto the layer of electrically conductive material via the one or more open pores of the etching template to form an open interconnected wall structure of electrically conductive material from the layer of electrically conductive material, the open interconnected wall structure defined by a lattice of substantially spherical particles defining one or more open pores, some or all of the open pores being arranged periodically, the one or more open pores being located in the wall structure, and depositing an active material within the one or more open pores, the active material for use in generating and/or storing electrical charge, wherein the open interconnected wall structure serves as a charge collector which provides an electrical path from the active material for the generated and/or stored electrical charge, wherein only some of the open pores are interconnecting, and wherein at least some of the open pores have a diameter of between 2 nm and 50 nm inclusive.

14. The method of claim 13, wherein the method comprises removing the etching template following removal of the regions of the layer of electrically conductive material.

15. The method of claim 13, wherein forming the etching template comprises depositing a plurality of particles on top of the layer of electrically conductive material to create the lattice of particles, the lattice of particles constituting the etching template, the open pores of the etching template formed from interconnected spaces between and defined by the plurality of particles.

16. The method of claim 13, wherein forming the etching template comprises:
depositing a block copolymer on top of the layer of electrically conductive material, the block copolymer comprising two or more immiscible polymer blocks; and
removing one or more of the immiscible polymer blocks to produce an open porous polymer structure, the open porous polymer structure constituting the etching template.

17. The method of claim 16, wherein the one or more immiscible polymer blocks are removed to produce an open porous polymer structure having a gyroid, double gyroid, vertically-oriented pillar or vertically-oriented lamellar morphology.

18. The apparatus of claim 1, wherein the open interconnected wall structure takes on a face-centered cubic opal shape of the lattice.

* * * * *